United States Patent
Boland et al.

(10) Patent No.: US 7,467,019 B2
(45) Date of Patent: Dec. 16, 2008

(54) COMPUTATION OF IMBALANCE IN ROTATABLY MOUNTED OBJECT IN A MOTION CONTROL SYSTEM

(75) Inventors: Patrick Gerard Boland, Kew (AU); Philippa Elizabeth Boland, Kew (AU)

(73) Assignee: ANCA Pty Ltd, Bayswater North, Victoria (AU)

( * ) Notice: Subject to any disclaimer, the term of this patent is extended or adjusted under 35 U.S.C. 154(b) by 0 days.

(21) Appl. No.: 10/592,410

(22) PCT Filed: Mar. 15, 2005

(86) PCT No.: PCT/AU2005/000365
§ 371 (c)(1),
(2), (4) Date: May 11, 2007

(87) PCT Pub. No.: WO2005/088269
PCT Pub. Date: Sep. 22, 2005

(65) Prior Publication Data
US 2007/0272014 A1 Nov. 29, 2007

(30) Foreign Application Priority Data
Mar. 15, 2004 (AU) .............................. 2004901360

(51) Int. Cl.
*G05B 11/01* (2006.01)
(52) U.S. Cl. ....................................................... 700/71
(58) Field of Classification Search .................. 700/71, 700/175, 279
See application file for complete search history.

(56) References Cited

U.S. PATENT DOCUMENTS

| | | | | |
|---|---|---|---|---|
| 4,626,754 A | * | 12/1986 | Habermann et al. | 318/460 |
| 4,977,510 A | * | 12/1990 | Winzenz et al. | 701/124 |
| 5,240,358 A | * | 8/1993 | Hackett et al. | 409/141 |
| 5,313,399 A | | 5/1994 | Beale | |
| 5,757,662 A | * | 5/1998 | Dyer et al. | 700/279 |
| 7,065,428 B2 | * | 6/2006 | Baran et al. | 700/174 |

FOREIGN PATENT DOCUMENTS

| | | |
|---|---|---|
| DE | 19614300 | 10/1996 |
| SU | 1111044 | 8/1984 |
| SU | 1221521 | 3/1986 |
| SU | 1270596 | 11/1986 |

* cited by examiner

*Primary Examiner*—Albert DeCady
*Assistant Examiner*—Chad Rapp
(74) *Attorney, Agent, or Firm*—Andrus, Sceales, Starke & Sawall, LLP (57) ABSTRACT

A method of computing imbalance in a motion control system is disclosed. The motion control system includes an object mounting mechanism for holding and rotating the object about a first axis; an object positioning mechanism for displacing the object mounting mechanism; an object positioning drive for driving the object positioning mechanism; and one or more rotation detection devices for generating an output signal indicative of the rotation of the object about the first axis. The method includes the steps of computing an object rotation signal indicative of the speed and phase of the object about the first axis from the rotation detection devices' output signal; demodulating an output signal from the drive with the object rotation signal to derive a demodulated output signal that is synchronous with rotation of the object about the first axis; and computing the magnitude and phase of the object imbalance from the demodulated output signal.

39 Claims, 6 Drawing Sheets

COMPUTATION OF IMBALANCE IN ROTATABLY MOUNTED OBJECT IN A MOTION CONTROL SYSTEM

CROSS-REFERENCE TO RELATED APPLICATIONS

This application is the U.S. national stage application of International Application PCT/AU2005/000365, filed 15 Mar. 2005, which international application was published on 22 Sep. 2005, as International Publication WO2005/088269 in the English language. The International Application claims priority of Australian Patent Application 2004901360, filed 15 Mar. 2004.

BACKGROUND TO THE INVENTION

The present invention relates generally to the balancing of a rotatably mounted object used in motion control system. This invention is particularly applicable to a multi axis computer numerically controlled (CNC)machine in which a grinding wheel is moved to operate on a work piece mounted in a rotatable chunk or headstock, and it will be convenient to describe the invention in relation to the exemplary, but non-limiting, application.

The development of multi axes and multifunction machine tools in conjunction with the development of sophisticated computer controlled operations has facilitated the emergence of a generation of very high speed precision machine tools capable of complex multi-step operations from one machine. Such machine tools typically hold a work piece in a controlled position whilst a movable cutting tool acts upon the work piece to perform a desired task.

Typically a CNC machine is controlled by a computer program which serially instructs the machine to perform a sequential series of discrete operations in a predetermined sequence so that the movable operative part moves along a programmed path determined by the part program. Each individual instruction is termed a "block" and many constitute a determining command for each or a combination of controllable axes. For example, a block may instruct a chuck holding a work piece to move 5 mm in a Y axis at a given velocity. Multiple axis blocks may instruct the chuck to rotate and move forward 0.05 mm in the X and Y axis at a given velocity. Another block may instruct a grinding wheel to be rotated about a C-axis to a predefined angular position and then rotated about a spindle when the work piece is bought into contact with the grinding wheel. The blocks, once programmed into the computer, are then fixed in a set sequential order. The whole set of sequential blocks may then be automatically operated by the CNC machine which then operates from start to finish of the part program.

One of the objects subject to high speed rotation and movement in a CNC machine is the grinding wheel. Over time, the grinding wheel can develop an imbalance. The imbalance causes radial movement in the spindle to which the grinding wheel is mounted, resulting in the precision of the grinding being diminished and the grinding wheel being subject to uneven wear.

In order to attempt to correct the imbalance, it is possible for an operator to manually affix a weight to one of the planar surfaces of the grinding wheel at a location that counteracts the imbalance of the grinding wheel. However, it is an extremely difficult task for an operator to identify the size of a suitable weight and the location on the grinding wheel at which to place that weight. Using trial and error to attempt to obtain an optimal weight size and location can be lengthy and ultimately unsuccessful at correcting the imbalance.

The nature of the imbalance can also be assessed by the mounting of external accelerometers about the spindle on which the grinding wheel is mounted. However, the cost of this extraneous equipment and the difficulty of mounting the accelerometers in an industrial environment make this technique difficult to implement.

It would therefore be desirable to provide a manner of computing and/or correcting imbalance in a rotatably mounted grinding wheel or other object in a motion control system, such as a CNC machine, that enabled the imbalance to be accurately determined.

It would also be desirable to enable the imbalance to be accurately identified without requiring extraneous analytical equipment to be used.

It would moreover be desirable to provide a method of computing and/or correcting an imbalance in a rotatably mounted grinding wheel or other object in a motion control system, such as a CNC machine, that ameliorates or overcomes one or more problems of existing motion control systems.

SUMMARY OF INVENTION

One aspect of the present invention provides a method of computing imbalance in a rotatably mounted object in a motion control system, the motion control system including an object mounting mechanism for holding and rotating the object about a first axis; an object positioning mechanism for displacing the object mounting mechanism; an object positioning drive for driving the object positioning mechanisms; and one or more rotation detection devices for generating an output signal indicative of the rotation of the object about the first axis, the method including the steps of:

computing an object rotation signal indicative of the speed and phase of the object about the first axis from the rotation detection devices output signal;

demodulating an output signal from the drive with the object rotation signal to derive a demodulated output signal that is synchronous with rotation of the object about the first axis; and computing the magnitude and phase of the object imbalance from the demodulated output signal.

The object positioning drive may include a motor and a controller for sending control signals to the motor, the controller including a processor for performing the steps of the imbalance computing method.

The processor may include a digital signal processor.

The rotation detection devices may include one or more proximity sensors mounted to detect rotation of a spindle about the first axis.

The processor may include clock means, a first counter for counting the total number of clock pulses during a complete rotation of the spindle about first axis and a second counter for counting the cumulative number of clock pulses during each rotation of the spindle about first axis, wherein the speed and phase of the object about the first axis are derived from the first and second counter outputs.

The method may further include the step of:

computing an average over a predetermined number N samples of the demodulated output signal to remove time-varying components.

The demodulating step may include:

demodulating the drive means output signal with quadrature components of the object rotation signal to derive two demodulated quadrature signal components.

In this case, the demodulating step may include:
filtering side-bands from each of the two demodulated quadrature signal components.

The step of computing the magnitude and phase of the object imbalance may include:
performing a first computation with the two demodulated quadrature signal components to derive the magnitude of the object imbalance; and
performing a second computation with the two demodulated quadrature signal components to derive the phase of the object imbalance.

The method may further include the step of:
directing a motion control system operator to add weight to a predetermined position on the object to compensate for the computed imbalance.

The motion control system operator may be directed to add weight by:
displaying a representation of the object to the operator; and
displaying a representation of the magnitude and phase of the object imbalance on the object presentation.

The representation may be a vectorial representation.

The object may be a grinding wheel.

Another aspect of the invention provides a motion control system including:
an object mounting mechanism for holding and rotating an object about a first axis;
an object positioning mechanism for displacing the object mounting mechanism;
an object positioning drive for driving the object positioning mechanism;
one or more rotation detection devices for generating an output signal indicative of the rotation of the object about the first axis;
means for computing an object rotation signal indicative of the speed and phase of the tool about the first axis from the rotation detection devices output signal;
means for demodulating an output signal from the drive with the object rotation signal to derive a demodulated output signal that is synchronous with rotation of the object about the first axis;
means for computing the magnitude and phase of the object imbalance from the demodulated output signal.

Yet another aspect of the invention provides a processing device for use in a motion control system, the motion control system including an object mounting mechanism for holding and rotating the object about a first axis; an object positioning mechanism for displacing the object mounting mechanism; an object positioning drive for driving the object positioning mechanism; and one or more rotation detection devices for generating an output signal indicative of the rotation of the object about the first axis, the processing means including:
means for computing an object rotation signal indicative of the speed and phase of the tool about the first axis from the rotation detection devices output signal;
means for demodulating an output signal from the drive with the object rotation signal to derive a demodulated output signal that is synchronous with rotation of the object about the first axis;
means for computing the magnitude and phase of the object imbalance from the demodulated output signal.

BRIEF DESCRIPTION OF THE DRAWINGS

A preferred embodiment of the invention will now be described, by way of example only, with reference to the accompanying drawings, in which.

DETAILED DESCRIPTION OF THE DRAWINGS

Figure 1:
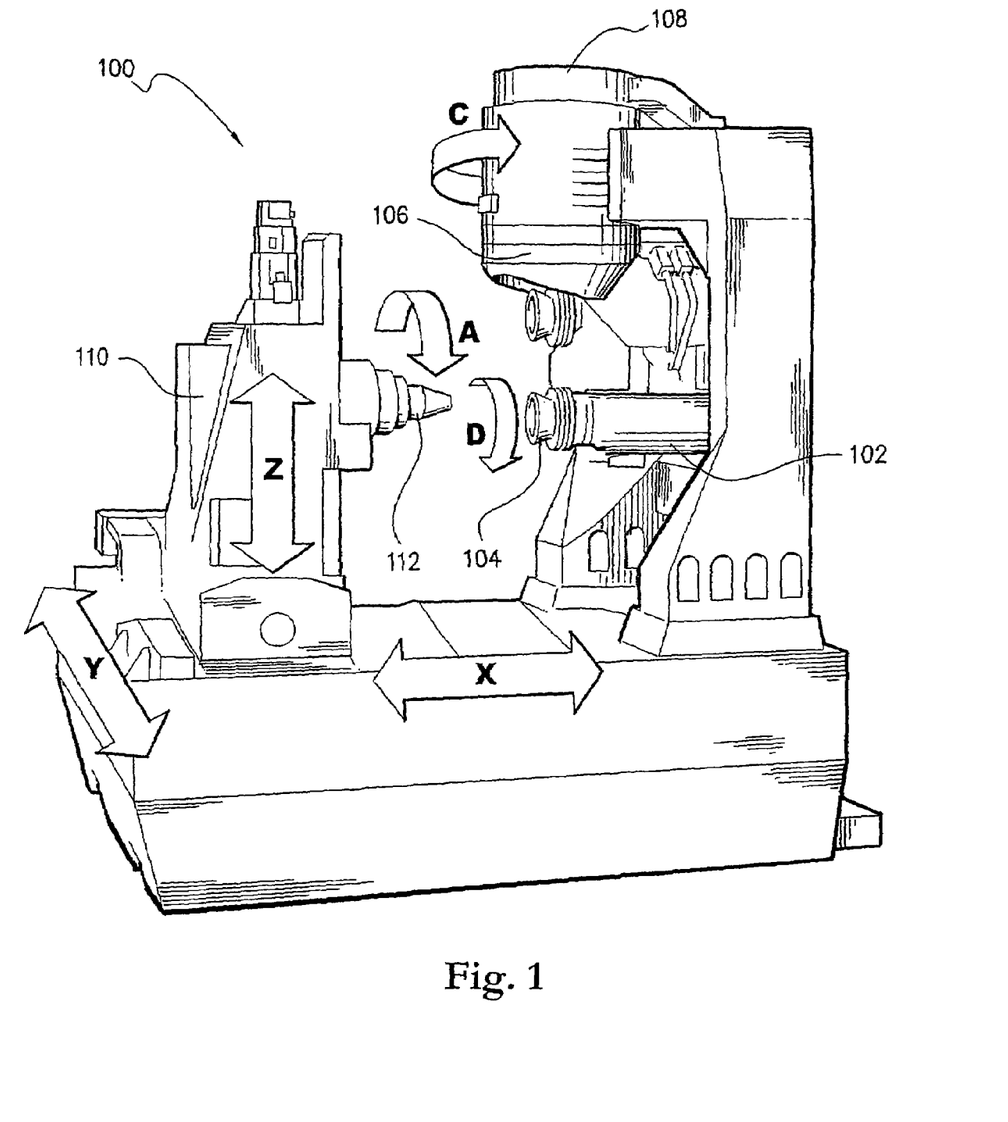
FIG. 1 is a perspective view of part of a computer numerically controlled (CNC) machine.

Referring now to FIG. 1, there is shown generally an assembly 100 forming part of a motion control system, in this case embodied by a computer numerically controlled (CNC) machine. The assembly 100 includes an object mounting mechanism 102 for holding and rotating a grinding wheel 104 or other rotatably mounted object about a first axis (D), and an object positioning mechanism 106 rotating the object mounting mechanism 102 about a second axis (C). An object positioning drive 108 is also provided for driving the object positioning mechanism 106 the C-axis. The CNC machine also includes work piece positioning mechanisms 110 for moving a work piece mounted in a chuck 112 in three perpendicular axes (X, Y, Z) so as to bring the work piece into contact with the grinding wheel 104 during operation of the CNC machine. Although the invention is described in this embodiment in relation to a CNC machine, it will be appreciated that the invention is equally applicable to other forms of automated motion control systems.

The work piece positioning mechanisms 110 also act to rotate the work piece about an axis (A) generally parallel to the D-axis about which the grinding wheel 104 is driven.

Figure 2:
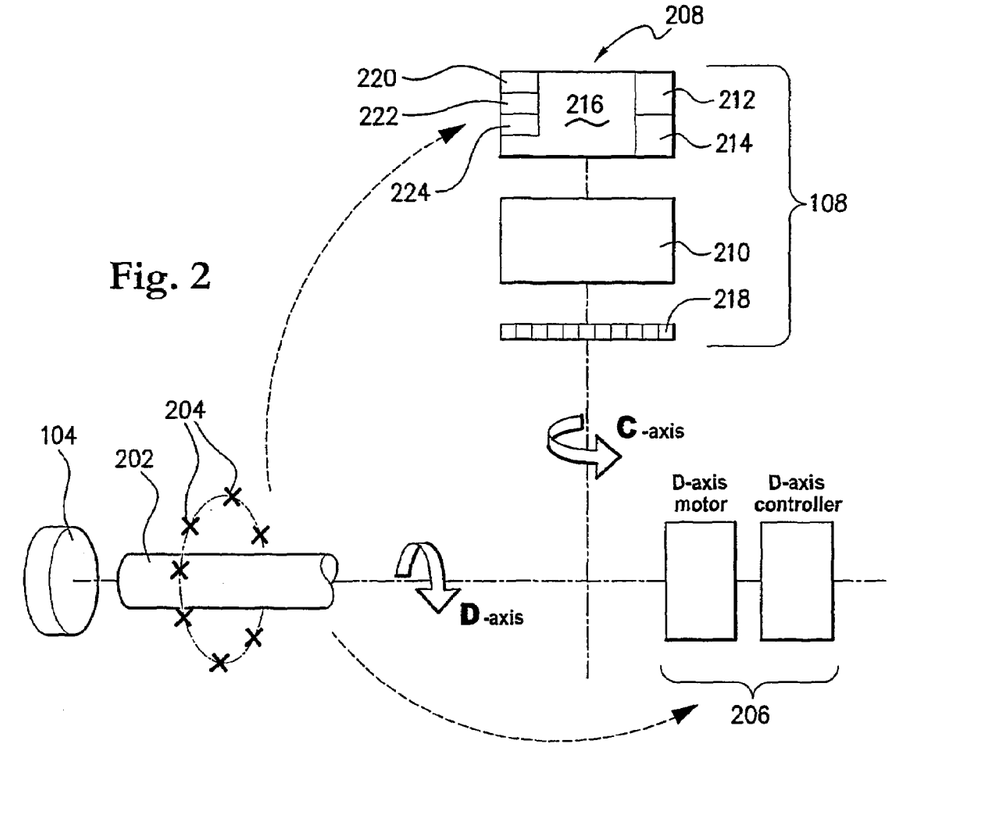
FIG. 2 is a schematic diagram illustrating the relationship between the C-axis and the spindle of the CNC machine of FIG. 1.

FIG. 2 shows schematically the C axis and D axis of the assembly 100 shown in FIG. 1, as well as selected elements of the CNC machine. Notably, a grinding wheel 104 is mounted to a spindle 202 forming part of the object mounting mechanism 102. A series 204 of one or more proximity sensors are mounted radially around the spindle 202. The spindle 202 has an irregular cross section, including a member of longitudinally running edges around its periphery, so that upon rotation of the spindle 202 about the D axis, the proximity sensors generate a series of pulses indicative of the speed of rotation of the spindle. In existing CNC machines, the radially mounted series 204 of proximity sensors are mounted in the object mounting mechanism 102 in order to provide an indication of the rotational speed of the grinding wheel to a D-axis drive 206.

The object positioning drive 108 is shown in FIG. 2 as including a controller 208 and motor 210 for causing rotation of the object positioning mechanism 106 about the C-axis. The controller 208 includes a processing device 212 and associated non-volatile memory device 214 for storing a series of instructions for causing the motor to act in a desired manner. In addition, the controller 208 includes a volatile memory 216 for storing temporary data generated during operation of the CNC machine.

The object positioning drive 108 also includes an encoder 218 for providing feedback information to the controller 208 indicative of the angular position of the object positioning mechanism 106, and hence the object mounting mechanism 102 and grinding wheel 104, about the C-axis. Due to the accuracy required in CNC machines, the encoder is a high precision device providing an indication of small angular displacements of the shaft of the motor 210 to the controller 208. The volatile memory 216 of the controller 208 includes a clock device 220, a first counter 222 and a second counter 224. The counter 222 acts to accumulate the total number of clock pulses during a complete rotation of the spindle 202, as indicated by the pulses output from the series 204 of proximity sensors, whilst the counter 224 acts to count the cumulative number of clock pulses during each rotation of the spindle 202.

Figure 3:
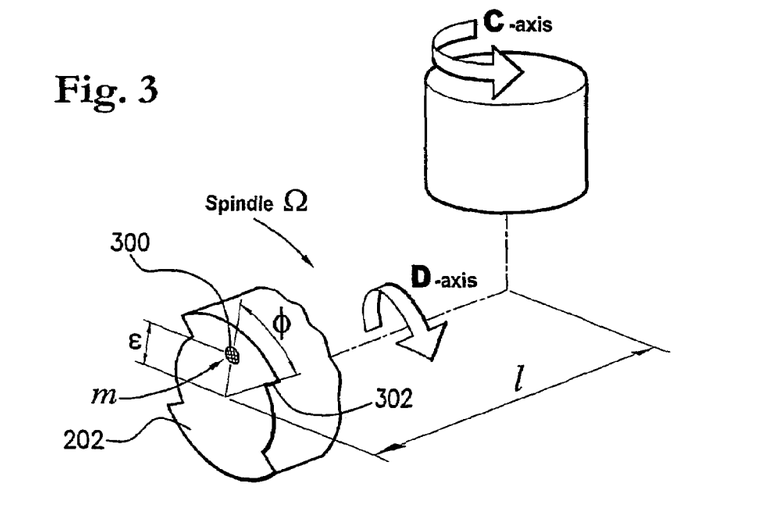
FIG. 3 is a schematic diagram illustrating the relationship of the C-axis to the spindle and associated grinding wheel of the CNC machine.

An imbalanced mass on the grinding wheel 104 will generate an imbalanced disturbance force and consequent vibration in the C-axis. FIG. 3 illustrates schematically the relationship of the C-axis to the spindle 202 and associated grinding wheel 104 of the CNC machine. In this figure, the spindle 202 is shown in cross section, and it can be seen that the four edges of the irregular cross section of the spindle 202 enable sequential activation of the proximity switches mounted about the D-axis as the spindle rotates. An imbalanced mass 300 is depicted as having a mass m, and being located at a distance from the D-axis of $\epsilon$. The mass m is also illustrated as being at an angle $\phi$ from one of the edges 302 of the cross section of the spindle 202. This edge can be used as a reference point to define the angular position of the imbalanced mass m about the D-axis. The imbalanced mass m is located at a distance l from the C-axis.

Figure 4:
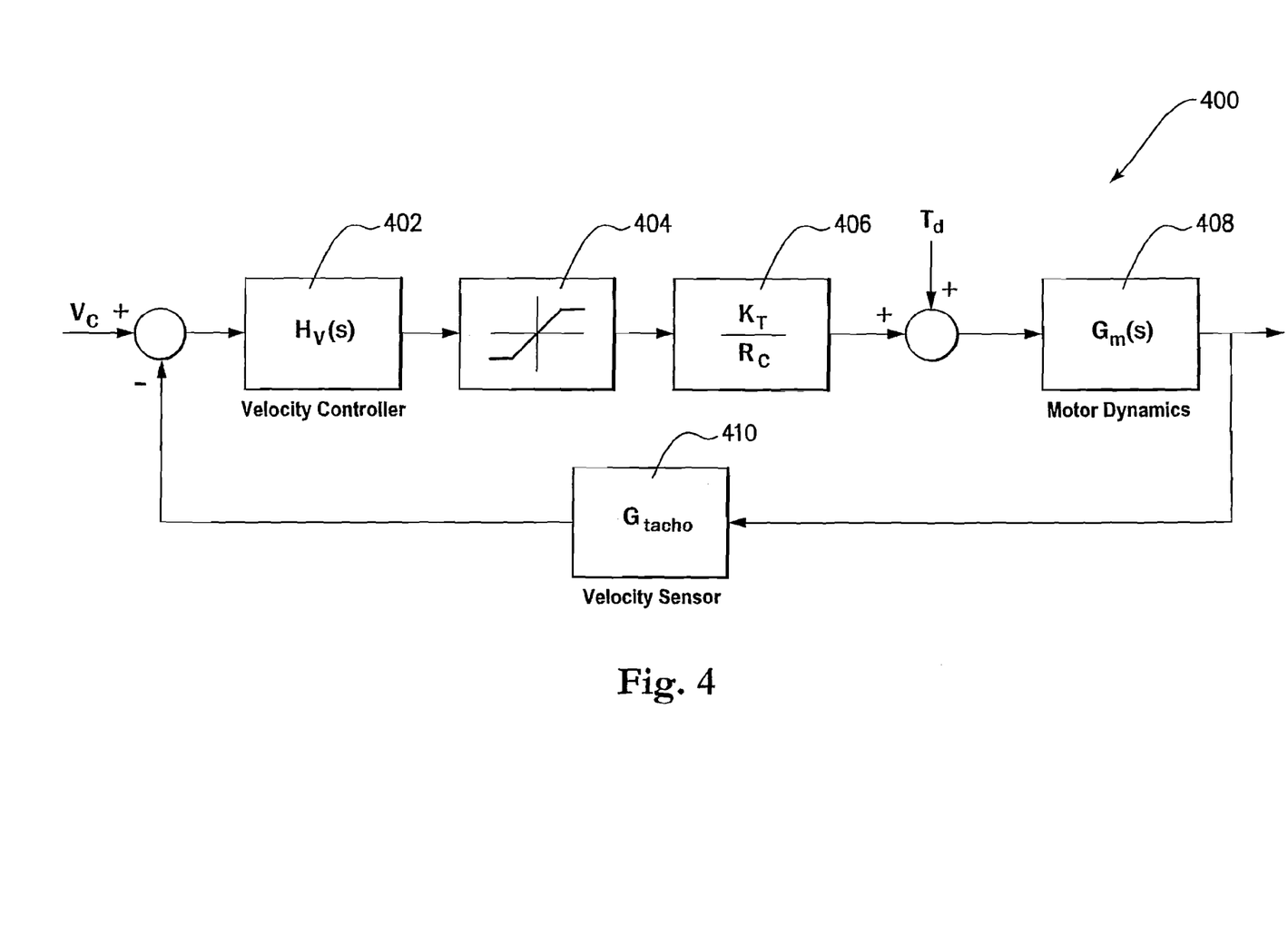
FIG. 4 is a diagram showing a velocity loop of the C-axis drive of the CNC machine of FIG. 1.

When the spindle 202 is rotating with an angular speed of $\Omega$, a disturbance torque $T_d$ is created on the C-axis. That disturbance torque $T_d$ is applied to a velocity control loop of the object positioning drive 108 as shown in FIG. 4. In this figure, it can be seen that the velocity control loop 400 includes a velocity controller component 402, a current command limiter component 404, a current loop torque component 406 and a motor dynamics component 408 in the forward path of the velocity control loop 400. The feedback path of the velocity control loop consists of a velocity sensor 410. The disturbance torque created on the C-axis by the imbalance caused by the mass m is added to the velocity control loop 400 in the forward path at the input to the motor dynamics element 408. The velocity response $\omega_m$ of the velocity control loop 400 is composed of two parts, namely a first response $\omega_{vc}$ being the response to the velocity command Vc provided by the controller 208 to the motor 210, and a second response $\omega_{T_d}$ being the velocity response to the torque disturbance $T_d$ due to the imbalance mass of the rotating spindle wheel. For the sake of simplicity, it can generally be considered that the response $\omega_{vc}$ to the Vc is zero.

The closed loop transfer function from the point at which the disturbance torque $T_d$ is applied to the velocity control loop 400 to the point at which the velocity response $\omega_m$ is extracted can be assumed to have an amplitude of K and a phase shift of $\theta$. As a result of this, the velocity response $\omega_{T_d}$ to the torque disturbance $T_d$ can be expressed according to the following formula:

$$\omega_{Td} = lm\epsilon\Omega^2 \sin(\Omega t + \phi + \theta)$$

It has been found by demodulating the velocity response $\omega_m$ of the C-axis with a sinusoidal signal having the same frequency as the spindle speed, valuable information regarding the imbalanced mass on the wheel can be identified. The velocity response $\omega_m$ of the velocity controller 400 is taken from the output signal of the controller 212 supplied to the motor 210. This output signal is demodulated by the controller 212 with quadrature components of a signal indicative of the rotation about the D-axis of the grinding wheel 104 and spindle 202.

The two quadrature components, namely $\sin \Omega t$ and $\cos \Omega t$, are both derived by the controller 208 from the clock signal generated by the clock 220 and the contents of the two counters 222 and 224. The clock signal provides an indication of the time t whereas the rotational speed $\Omega$ of the spindle 220 is derived from the contents of the two counters 222 and 224.

Figure 5:
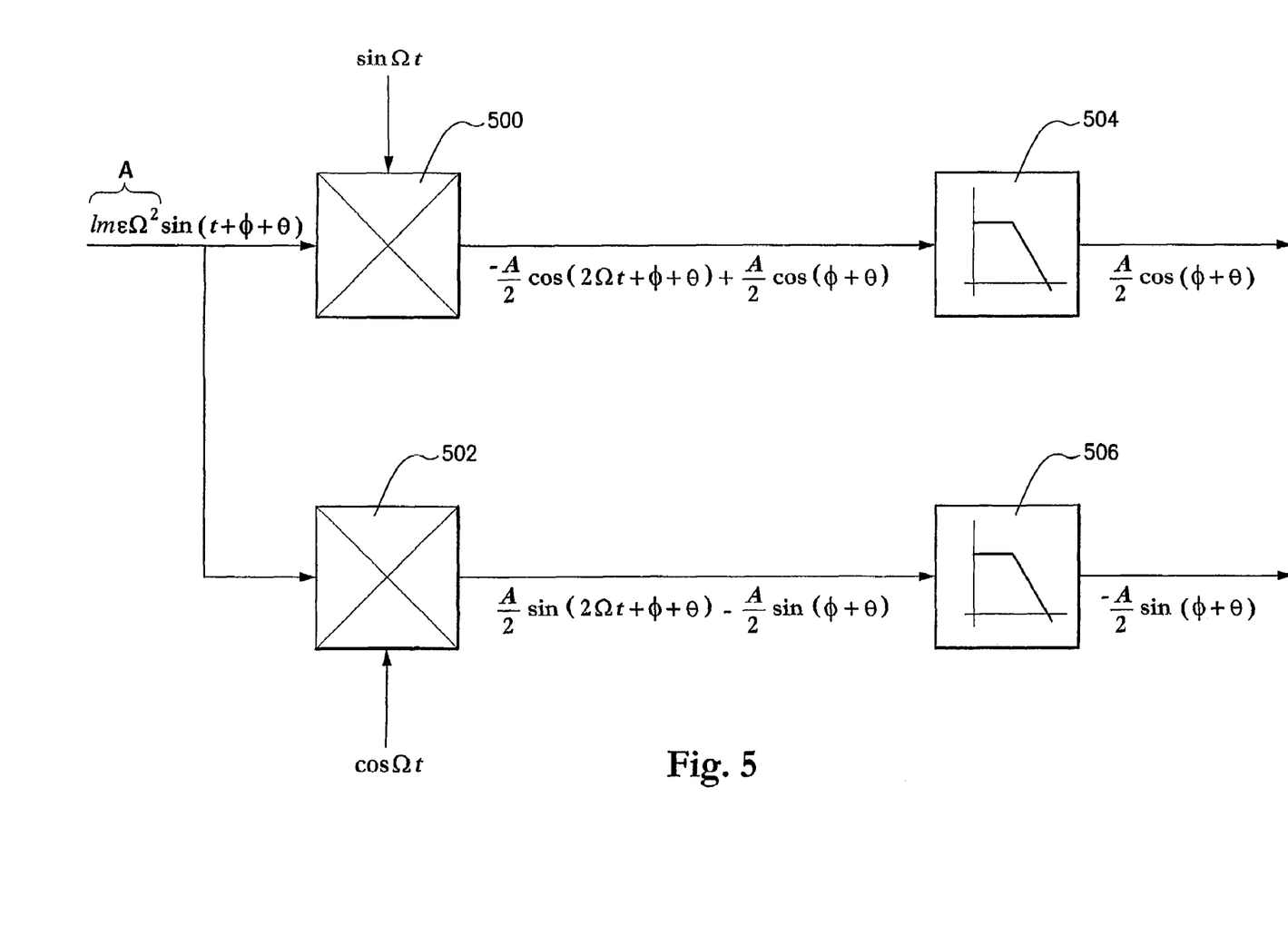
FIGS. 5 to 7 are diagrams showing steps involved in demodulating the C-axis drive output signal of the CNC machine of FIG. 1 to compute the magnitude and phase of the grinder wheel imbalance.

The two quadrature components of the rotation signal are multiplexed with the output signal from the controller 208 by means of multipliers 500 and 502. After demodulation, the two demodulated quadrature signal components are respectively represented by:

$$\frac{-A}{2}\cos(2\Omega t + \varphi + \theta) + \frac{A}{2}\cos(\varphi + \theta) \qquad \text{Component 1}$$

$$\frac{A}{2}\sin(2\Omega t + \varphi + \theta) - \frac{A}{2}\sin(\varphi + \theta) \qquad \text{Component 2}$$

Low pass filtering is applied to each of the quadrature signal components by filters 504 and 506 to filter side bands from each of these signal components. Accordingly, after filtering, the demodulator quadrature signal components are represented by:

$$\frac{A}{2}\cos(\varphi + \theta) \qquad \text{Component 1}$$

$$\frac{-A}{2}\sin(\varphi + \theta) \qquad \text{Component 2}$$

Figure 6:
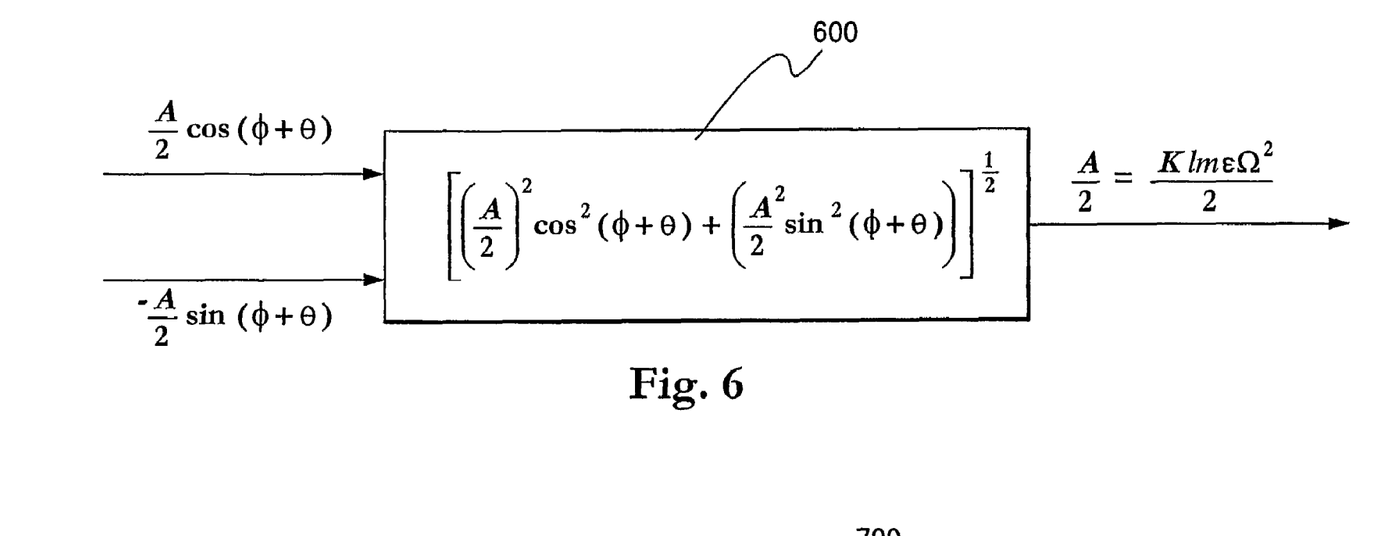

The magnitude and phase of the imbalanced mass is then determined by performing two different computations with the two demodulator quadrature signal components. A first computation is performed by the computation block 600 illustrated in FIG. 6, where the two demodulator quadrature signal components are combined as follows:

$$\left[\left(\frac{A}{2}\right)^2 \cos^2(\varphi + \theta) + \left(\frac{A^2}{2}\sin^2(\varphi + \theta)\right)\right]^{\frac{1}{2}}$$

The output of the computation block 600 provides the magnitude of the imbalanced mass as $$\frac{A}{2} = \frac{Klm\varepsilon\Omega^2}{2}$$

Figure 7:
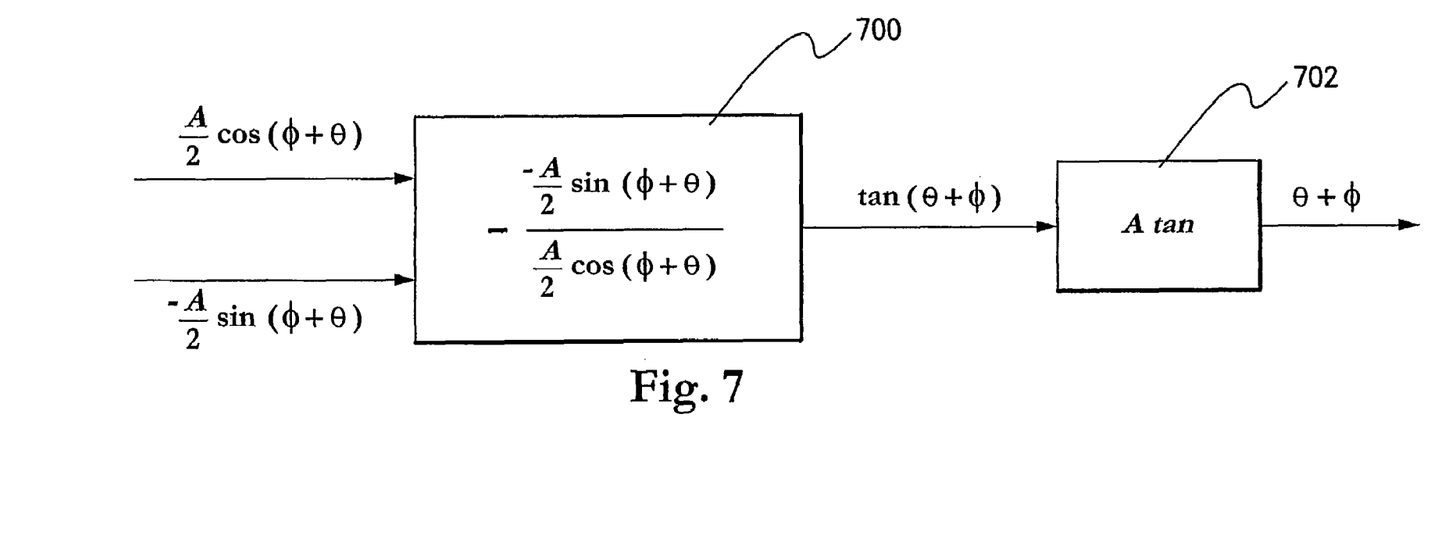

A second computation block 700 shown in FIG. 7 combines two demodulator quadrature signal components as follows:

$$-\frac{\frac{-A}{2}\sin(\varphi + \theta)}{\frac{A}{2}\cos(\varphi + \theta)}$$

The output of the computation block 700 provides tan $(\theta + \phi)$. An arc tan function is then applied by computation block 702 to determine the phase θ+φ of the imbalanced mass. Since the phase shift θ is fixed, the value of the angle φ of the imbalanced mass from the reference edge to the spindle 202 can then be easily determined.

Figure 8:
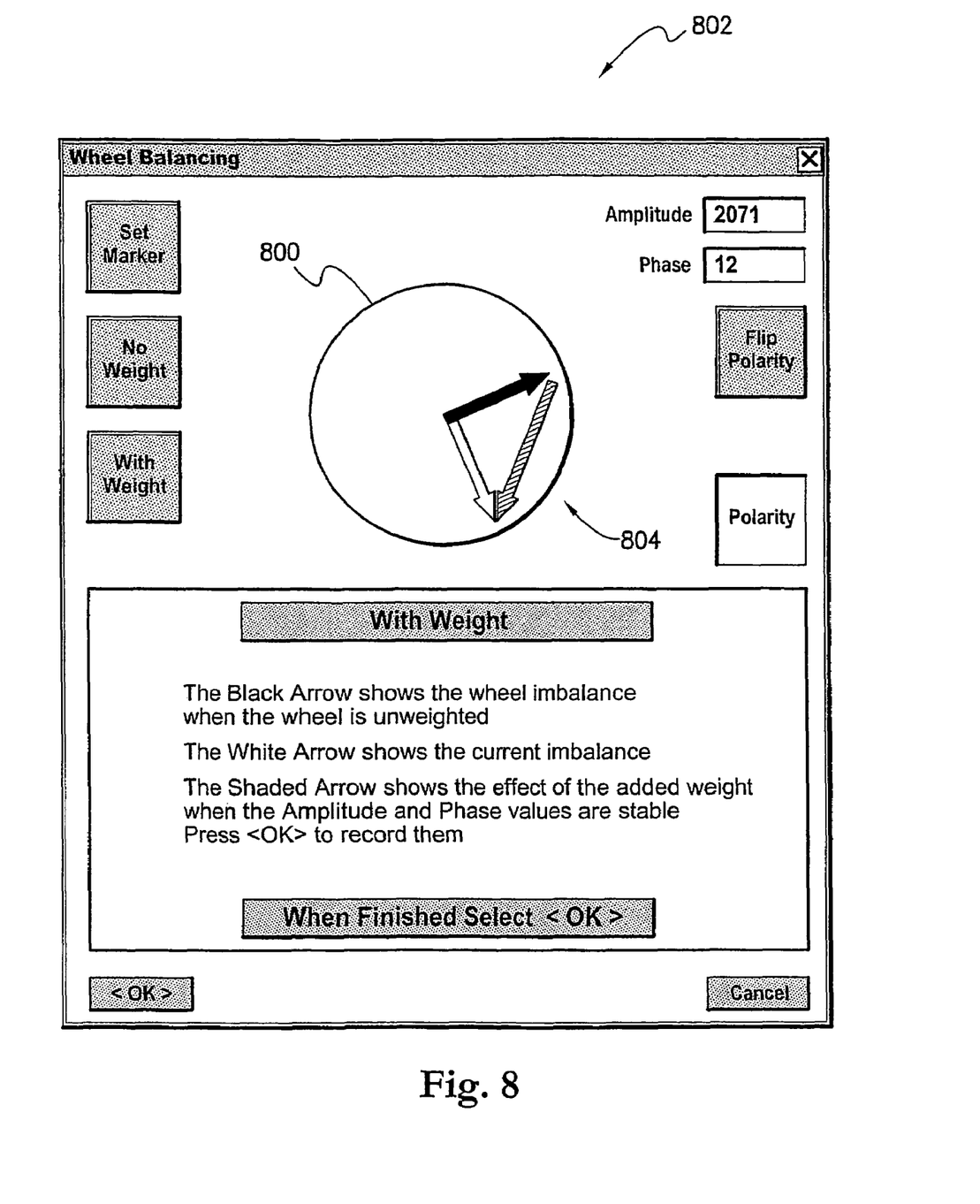
FIG. 8 is a representation of a graphical display presented to an operator of the CNC machine of FIG. 1 to enable correction of the grinding wheel imbalance.

As shown in FIG. 8, having now determined the value of the phase and the magnitude of the mass imbalance, a graphical representation 800 of the grinding wheel 104 can be displayed to the user at a graphic user interface 802 by the controller 208. A vectorial representation 804 of the value and the phase of the mass causing the imbalance can then be depicted on the representation of the grinding wheel 104. The operator is then able to add a counter balancing mass of appropriate magnitude at a location opposite that indicated by the vectorial representation of the mass imbalance on the display. Correct positioning of the mass counter balance can then be determined by causing the spindle 202 and grinding wheel 104 to be once again be driven about the D-axis and a determination to be made of the magnitude and phase of any resultant mass imbalance once again displayed.

It will be appreciated that the above described calculations are performed by the controller 208. Conveniently, the processing device 212 of the controller 208 is a digital signal processor and the various demodulation steps and quadrature signal computations are conveniently performed using a series of digital processing operations.

Finally, it will be appreciated that various modifications and/or additions may be made to the above described method and system for computing imbalance in a motion control system according to the present invention without departing from the spirit or ambit of the invention. For example, whilst the present invention has been described in relation to a mass imbalance on a grinding wheel in a CNC machine, it will be appreciated that the present invention is also applicable to the computation and/or correction of mass imbalances in objects rotating about other axes of the CNC machine or like motion control system.

The invention claimed is:

1. A method of computing imbalance in a motion control system, the motion control system including an object mounting mechanism for holding and rotating the object about a first axis; an object positioning mechanism for displacing the object mounting mechanism; an object positioning drive for driving the object positioning mechanism; and one or more rotation detection devices for generating an output signal indicative of the rotation of the object about the first axis, the method including the steps of:
   computing an object rotation signal indicative of the speed and phase of the object about the first axis from the rotation detection devices output signal;
   demodulating an output signal from the drive means with the object rotation signal to derive a demodulated output signal that is synchronous with rotation of the object about the first axis; and
   computing the magnitude and phase of the object imbalance from the demodulated output signal.

2. A method according to claim 1 wherein the object positioning drive includes a motor and a controller for sending control signals to the motor, the controller including a processor for performing the steps of the imbalance computing method.

3. A method according to claim 2, wherein the processor includes a digital signal processor.

4. A method according to claim 1 wherein rotation detection devices includes one or more proximity sensors mounted to detect rotation of a spindle about the first axis.

5. A method according to claim 4, wherein the processor includes a clock, a first counter for counting the total number of clock pulses during a complete rotation of the spindle about the first axis and a second counter for counting the cumulative number of clock pulses during each rotation of the spindle about the first axis, wherein the speed and phase of the object about the first axis are derived from the first and second counter outputs.

6. A method according to claim 1, further including the step of:
   computing an average over a predetermined number N samples of the demodulated output signal to remove time-varying components.

7. A method according to claim 1, wherein the demodulating step includes:
   demodulating the drive output signal with quadrature components of the object rotation signal to derive two demodulated quadrature signal components.

8. A method according to claim 7, wherein the demodulating step includes:
   filtering side-bands from each of the two demodulated quadrature signal components.

9. A method according to claim 1, wherein the step of computing the magnitude and phase of the object imbalance includes:
   performing a first computation with two demodulated quadrature signal components to derive the magnitude of the object imbalance; and
   performing a second computation with the two demodulated quadrature signal components to derive the phase of the object imbalance.

10. A method according to claim 1, the method further including the step of:
   directing a motion control system operator to add weight to a predetermined position on the object to compensate for the computed imbalance.

11. A method according to claim 10, wherein the motion control system operator is directed to add weight by:
   displaying a representation of the object to the operator; and
   displaying a representation of the magnitude and phase of the object imbalance on an object presentation.

12. A method according to claim 11, wherein the representation is a vectorial representation.

13. A method according to claim 1, wherein the object is a grinding wheel.

14. A method according to claim 1, wherein the motion control system is a computer numerically controlled (CNC) machine.

15. A motion control system including:
   an object mounting mechanism for holding and rotating an object about a first axis;
   an object positioning mechanism for displacing the object mounting mechanism;
   an object positioning drive for driving the object positioning mechanism;
   one or more rotation detection devices for generating an output signal indicative of the rotation of the object about the first axis; and
   a processor for computing an object rotation signal indicative of the speed and phase of the object about the first axis from the rotation detection devices output signal;
   demodulating an output signal from the drive with the object rotation signal to derive a demodulated output signal that is synchronous with rotation of the object about the first axis; and
   computing the magnitude and phase of the object imbalance from the demodulated output signal.

16. A motion control system according to claim 15, wherein the object positioning drive includes a motor and a controller for sending control signals to the motor, wherein the processor is included within the controller.

17. A motion control system according to claim 16, wherein the processor includes a digital signal processor.

18. A motion control system according to claim 15, wherein the rotation detection devices includes one or more proximity sensors mounted to detect rotation of a spindle about the first axis.

19. A motion control system according to claim 16, wherein the processor includes a clock, a first counter for counting the total number of clock: pulses during a complete rotation of the spindle about the first axis and a second counter for counting the cumulative number of clock pulses during each rotation, of the spindle about the first axis, wherein the speed and phase of the object about the first axis are derived from the first and second counter outputs.

20. A motion control system according to claim 15, wherein the processor acts to compute an average over a predetermined number N samples of the demodulated output signal to remove time-varying components.

21. A motion control system according to claim 15, wherein the processor acts to demodulate the drive means output signal with quadrature components of the object rotation signal to derive two demodulated quadrature signal components.

22. A motion control system according to claim 21, wherein the processor acts to filter side-bands from each of the two demodulated quadrature signal components.

23. A motion control system according to claim 15, wherein the processor acts to compute the magnitude and phase of the object imbalance by performing a first computation with two demodulated quadrature signal components to derive the magnitude of the object imbalance; and performing a second computation with the two demodulated quadrature signal components to derive the phase of the object imbalance.

24. A motion control system according to claim 15, and further including a display for directing a CNC machine operator to add weight to a predetermined position on the object to compensate for the computed imbalance.

25. A motion control system according to claim 24, wherein the display acts to display a representation of the object to the operator; and display a representation of the magnitude and phase of the object imbalance on an object presentation.

26. A motion control system according to claim 25, wherein the representation is a vectorial representation.

27. A motion control system according to claim 15, wherein the object is a grinding wheel.

28. A motion control system according to claim 15, wherein the motion control system is a computer numerically controlled (CNC) machine.

29. A processor for use in a motion control system, the motion control system including an object mounting mechanism for holding and rotating an object about a first axis; an object positioning mechanism for displacing the object mounting mechanism; an object positioning drive for driving the object positioning mechanism; and rotation detection means for generating an output signal indicative of the rotation of the object about the first axis, the processor acting to:

compute an object rotation signal indicative of the speed and phase of the object about the first axis from the rotation detection devices output signal;

demodulate an output signal from the drive with the object rotation signal to derive a demodulated output signal that is synchronous with rotation of the object about the first axis; and compute the magnitude and phase of the object imbalance from the demodulated output signal.

30. A processor according to claim 29, wherein the processor includes a digital signal processor.

31. A processor according to claim 29, wherein the rotation detection devices include one or more proximity sensors mounted to detect rotation of a spindle about the first axis, the processor including:

a clock, a first counter for counting the total number of clock pulses during a complete rotation of the spindle about the first axis and a second counter for counting the cumulative number of clock pulses during each rotation of the spindle about the first axis, wherein the speed and phase of the object about the first axis are derived from the first and second counter outputs.

32. A processor according to claim 29, the processor further acting to:

compute an average over a predetermined number N samples of the demodulated output signal to remove time-varying components.

33. A processor according to claim 29, the processor further acting to:

demodulate the drive output signal with quadrature components of the object rotation signal to derive two demodulated quadrature signal components.

34. A processor according to claim 33, the processor further acting to:

filter side-bands from each of the two demodulated quadrature signal components.

35. A processor according to claim 29, the processor further acting to compute the magnitude and phase of the object imbalance by performing a first computation with two demodulated quadrature signal components to derive the magnitude of the object imbalance; and performing a second computation with the two demodulated quadrature signal components to derive the phase of the object imbalance.

36. A processor according to claim 29, the processor further acting to direct a motion control system operator to add weight to a predetermined position on the object to compensate for the computed imbalance by displaying a representation of the object to the operator; and displaying a representation of the magnitude and phase of the object imbalance on an object presentation.

37. A processor according to claim 36, wherein the representation is a vectorial representation.

38. A processor according to claim 29, wherein the object is a grinding wheel.

39. A processor according to claim 29, wherein the motion control system is a computer numerically controlled (CNC) machine.

* * * * *